US010298591B2

(12) United States Patent
Eberlein et al.

(10) Patent No.: US 10,298,591 B2
(45) Date of Patent: May 21, 2019

(54) SECURE INTEGRATION OF INDEPENDENT CLOUD FOUNDRY APPLICATIONS IN A FIORI LAUNCHPAD

(71) Applicant: SAP SE, Walldorf (DE)

(72) Inventors: Peter Eberlein, Malsch (DE); Martijn de Boer, Heidelberg (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 15/581,459

(22) Filed: Apr. 28, 2017

(65) Prior Publication Data

US 2018/0316685 A1 Nov. 1, 2018

(51) Int. Cl.
*H04L 29/06* (2006.01)

(52) U.S. Cl.
CPC ........ *H04L 63/102* (2013.01); *H04L 63/0245* (2013.01); *H04L 63/08* (2013.01); *H04L 63/104* (2013.01)

(58) Field of Classification Search
None
See application file for complete search history.

(56) References Cited

U.S. PATENT DOCUMENTS

| | | |
|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |

(Continued)

OTHER PUBLICATIONS

U.S. Appl. No. 14/960,983, filed Dec. 7, 2015, Eberlein, et al.

(Continued)

*Primary Examiner* — James R Marandi
(74) *Attorney, Agent, or Firm* — Fish & Richardson P.C.

(57) ABSTRACT

An Open Authorization (OAuth) Client Secret of an application associated with a Multi-Tenant Application (MTA) deployed in a cloud-computing environment if read with a Fiori Launchpad (FLP) Deployer. The FLP Deployer writes, as content to a FLP Repository, the OAuth Client Secret and FLP Config data for the application read from a FLP Config data store. An App Router/shared FLP (App Router/FLP) accesses the FLP Repository to read content and OAuth Client Secrets for the application that has deployed to the App Router/FLP. A User Account and Authentication (UAA) service associated with the App Router/FLP is accessed to fetch an authorization token for a user after receiving a user connection to the App Router/FLP. An original user authorization token obtained for the user is exchanged with an application-specific authorization token. User interface elements displayed in the FLP are filtered based on scopes read from the exchanged application-specific authorization token.

20 Claims, 4 Drawing Sheets

(56) References Cited

U.S. PATENT DOCUMENTS

| | | | |
|---|---|---|---|
| 8,356,010 | B2 | 1/2013 | Driesen |
| 8,375,130 | B2 | 2/2013 | Eberlein et al. |
| 8,380,667 | B2 | 2/2013 | Driesen |
| 8,392,573 | B2 | 3/2013 | Lehr et al. |
| 8,402,086 | B2 | 3/2013 | Driesen et al. |
| 8,407,297 | B2 | 3/2013 | Schmidt-Karaca et al. |
| 8,434,060 | B2 | 4/2013 | Driesen et al. |
| 8,467,817 | B2 | 6/2013 | Said et al. |
| 8,479,187 | B2 | 7/2013 | Driesen et al. |
| 8,543,994 | B2 | 9/2013 | de Boer et al. |
| 8,560,876 | B2 | 10/2013 | Driesen et al. |
| 8,566,784 | B2 | 10/2013 | Driesen et al. |
| 8,572,369 | B2 | 10/2013 | Schmidt-Karaca et al. |
| 8,604,973 | B2 | 12/2013 | Schmidt-Karaca et al. |
| 8,612,406 | B1 | 12/2013 | Said et al. |
| 8,645,483 | B2 | 2/2014 | Odenheimer et al. |
| 8,706,772 | B2 | 4/2014 | Hartig et al. |
| 8,751,573 | B2 | 6/2014 | Said et al. |
| 8,762,731 | B2 | 6/2014 | Engler et al. |
| 8,762,929 | B2 | 6/2014 | Driesen |
| 8,793,230 | B2 | 7/2014 | Engelko et al. |
| 8,805,986 | B2 | 8/2014 | Driesen et al. |
| 8,875,122 | B2 | 10/2014 | Driesen et al. |
| 8,880,486 | B2 | 11/2014 | Driesen et al. |
| 8,924,384 | B2 | 12/2014 | Driesen et al. |
| 8,924,565 | B2 | 12/2014 | Lehr et al. |
| 8,972,934 | B2 | 3/2015 | Driesen et al. |
| 8,996,466 | B2 | 3/2015 | Driesen |
| 9,003,356 | B2 | 4/2015 | Driesen et al. |
| 9,009,105 | B2 | 4/2015 | Hartig et al. |
| 9,026,502 | B2 | 5/2015 | Driesen et al. |
| 9,026,857 | B2 | 5/2015 | Becker et al. |
| 9,031,910 | B2 | 5/2015 | Driesen |
| 9,032,406 | B2 | 5/2015 | Eberlein |
| 9,069,832 | B2 | 6/2015 | Becker et al. |
| 9,069,984 | B2 | 6/2015 | Said et al. |
| 9,077,717 | B2 | 7/2015 | Said et al. |
| 9,122,669 | B2 | 9/2015 | Demant et al. |
| 9,137,130 | B2 | 9/2015 | Driesen et al. |
| 9,182,979 | B2 | 11/2015 | Odenheimer et al. |
| 9,183,540 | B2 | 11/2015 | Eberlein et al. |
| 9,189,226 | B2 | 11/2015 | Driesen et al. |
| 9,223,985 | B2 | 12/2015 | Eberlein et al. |
| 9,229,707 | B2 | 1/2016 | Borissov et al. |
| 9,256,840 | B2 | 2/2016 | Said et al. |
| 9,262,763 | B2 | 2/2016 | Peter et al. |
| 9,724,757 | B2 | 8/2017 | Barrett |
| 2008/0120129 | A1 | 5/2008 | Seubert et al. |
| 2013/0325672 | A1 | 12/2013 | Odenheimer et al. |
| 2013/0332424 | A1 | 12/2013 | Nos et al. |
| 2014/0047319 | A1 | 2/2014 | Eberlein |
| 2014/0101099 | A1 | 4/2014 | Driesen et al. |
| 2014/0108440 | A1 | 4/2014 | Nos |
| 2014/0164963 | A1 | 6/2014 | Klemenz et al. |
| 2014/0325069 | A1 | 10/2014 | Odenheimer et al. |
| 2014/0379677 | A1 | 12/2014 | Driesen et al. |
| 2015/0006608 | A1 | 1/2015 | Eberlein et al. |
| 2015/0100546 | A1 | 4/2015 | Eberlein et al. |
| 2015/0178332 | A1 | 6/2015 | Said et al. |
| 2017/0025441 | A1 | 1/2017 | Mori |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/356,190, filed Nov. 18, 2016, Eberlein, Peter.

SECURE INTEGRATION OF INDEPENDENT CLOUD FOUNDRY APPLICATIONS IN A FIORI LAUNCHPAD

BACKGROUND

SAP FIORI is framework that provides the porting of applications (for example, transactional, analytical, and fact) to mobile devices (for example, IOS, ANDROID, and WINDOWS platforms), enabling the applications to be used on desktop computers, tablets, and smartphones. The FIORI LAUNCHPAD (FLP) is the central entry point for FIORI applications at a common URL and displays a home page with tiles, which can display live status indicators, such as the number of open tasks. Each tile represents application that the user can launch. The FLP is role-based, displaying tiles according to the user's role.

The existing FLP solution (for example, FIORI applications and plain UI5-type applications) is not compatible with the structure of applications in a database/cloud-computing-type environment (for example, SAP HANA XS ADVANCED (XSA)/HANA CLOUD PLATFORM (HCP) CLOUD FOUNDRY environment. In these environments, each application (in the sense of a Multi-Target Application (MTA)) needs to add its own content (for example, FIORI Tiles) to the shared FLP, which itself is deployed as an MTA in the XSA/HCP CLOUD FOUNDRY. In contrast, plain UI5-type applications have separate entry points (URLs) and host their own UI content individually. As the FLP is shared, it cannot simply be re-deployed with new content associated with an MTA, but the content must be added without downtime to an already existing FLP.

SUMMARY

The present disclosure describes deploying user interface (UI) content from a Multi-Target Application (MTA) to a shared FIORI LAUNCHPAD (FLP).

In an implementation, an Open Authorization (OAuth) Client Secret of an application associated with a Multi-Tenant Application (MTA) deployed in a cloud-computing environment if read with a Fiori Launchpad (FLP) Deployer. The FLP Deployer writes, as content to a FLP Repository, the OAuth Client Secret and FLP Config data for the application read from a FLP Config data store. An App Router/shared FLP (App Router/FLP) accesses the FLP Repository to read content and OAuth Client Secrets for the application that has deployed to the App Router/FLP. A User Account and Authentication (UAA) service associated with the App Router/FLP is accessed to fetch an authorization token for a user after receiving a user connection to the App Router/FLP. An original user authorization token obtained for the user is exchanged with an application-specific authorization token. User interface elements displayed in the FLP are filtered based on scopes read from the exchanged application-specific authorization token.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, the described approach allows for UI content from MTA applications to be deployed to a shared FLP. This is appealing in that the structure of existing applications used with the existing FLP is different from those of applications used in in a database/cloud-computing-type environment. Second, the described approach addresses several dimensions of securely integrating independent applications in the shared FLP. Third, the described enhancement to the shared FLP provides the means to deploy UI content from the independent applications into a shared FLP repository. Fourth, a secure method of authentication is provided to each independent application based on an authorization token ("token") exchange mechanism that is automatically configured during deployment. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
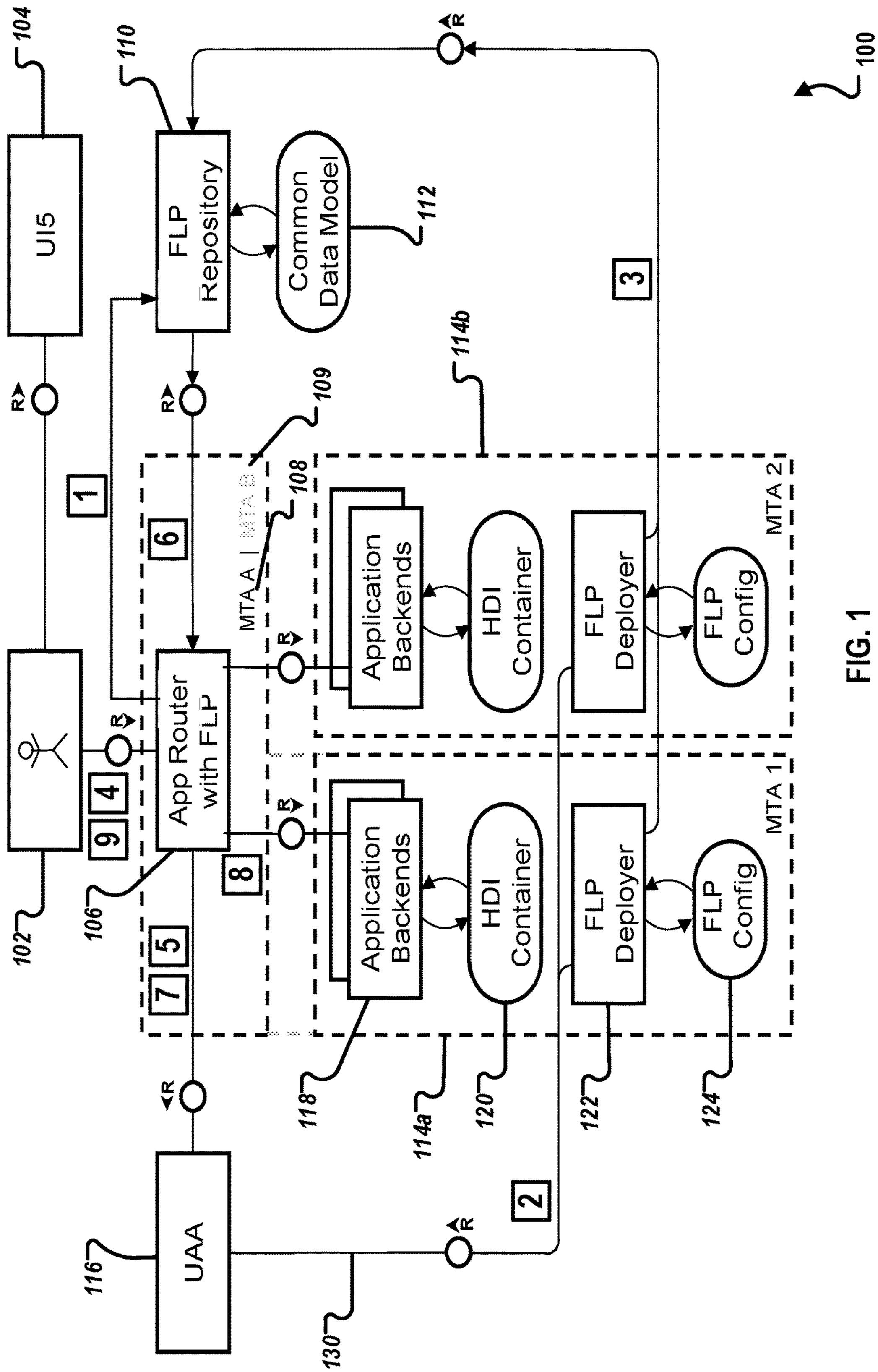
FIG. 1 is a block diagram illustrating an example system for securely integrating independent CLOUD FOUNDRY applications in a FIORI LAUNCHPAD (FLP), according to an implementation.

The following detailed description describes deploying user interface (UI) content from a Multi-Target Application (MTA) to a shared FIORI LAUNCHPAD (FLP), and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

SAP FIORI is framework that provides the porting of applications (for example, transactional, analytical, and fact) to mobile devices (for example, IOS, ANDROID, and WINDOWS platforms), enabling the applications to be used on desktop computers, tablets, and smartphones. The FLP is the central entry point for FIORI applications at a common URL and displays a home page with tiles, which can display live status indicators, such as the number of open tasks. Each tile represents an application that the user can launch. The FLP is role-based, displaying tiles according to the user's role.

The existing FLP solution (for example, FIORI applications and plain UI5-type applications) is not compatible with the structure of applications in a database/cloud-computing-type environment (for example, SAP HANA XS ADVANCED (XSA)/HANA CLOUD PLATFORM (HCP) CLOUD FOUNDRY environment. In these environments, each application (in the sense of a Multi-Target Application (MTA)) needs to add its own content (for example, FIORI Tiles) to the shared FLP, which itself is deployed as an MTA in the XSA/HCP CLOUD FOUNDRY. In contrast, plain UI5-type applications have separate entry points (URLs) and host their own UI content individually. As the FLP is shared, it cannot simply be re-deployed with new content associated with an MTA, but the content must be added without downtime to an already existing FLP.

As each MTA defines its own access restrictions in form of scopes (for example, read a purchase order and apply/approve vacation request) and attributes that are defined in the context of the MTA's Open Authorization (OAuth) Client, the token (for example, a JSON Web Token (JWT)) that is issued to a user when he or she logs on to the FLP needs to be exchanged for an MTA specific token for the respective MTA's OAuth Client. For this, an Application Router ("App Router)) needs access to the OAuth Client Secret that must be automatically configured during deployment in a secure way.

In XSA/HCP CLOUD FOUNDRY-type applications, the technical component providing a central entry point for both FIORI applications and plain UI5 applications is the App Router. In the case of FIORI applications, the App Router is shared as it has to serve the content for all applications that it hosts. This content is stored in a FLP Repository that additionally provides customization and personalization features. In order to add an application to a FLP, the application's UI content is included in the MTA in a separate module and deployed to the FLP Repository by a FLP Deployer Application ("FLP Deployer"). This content also includes the App Router configuration (for example, in an xs-app.json file) and OAuth Client Secret of the application to enable the shared App Router to request the appropriate token for the respective application.

FIG. 1 is a block diagram illustrating an example system 100 for securely integrating independent CLOUD FOUNDRY applications in a shared FLP, according to an implementation. As illustrated, system 100 includes a user 102, static libraries 104 (for example, those used by UI5 technology for user interfaces), an App Router (extended) with shared FLP ("App Router") 106, MTA A 108 (for example, represented by the dashed box around the App Router/FLP 106), MTA B 109 (refer to a following detailed explanation), FLP repository 110, common data model 112, MTA 1 114*a*/MTA 2 114*b* (114*a* is described with detail), and User Account and Authentication (UAA) service instance 116. MTA 1 114*a* (MTA 2 114*b* is analogous) includes an Application Backend 118 (for example, a database and supporting elements), HANA Deployment Infrastructure (HDI) Container 120 (for deployment purposes and permitting, for example, multiple deployments, sandboxing, and enhanced security options for all database artifacts), a FLP Deployer 122, and a FLP Config 124.

In some implementations, elements of system 100 communicate over network 130. While only one connection has been explicitly identified in the illustration of FIG. 1, other connections are also assumed to use network 130. In other implementations, two or more cooperating networks can be used by elements of system 100 for communication.

In system 100, the App Router/FLP 106 and each independent application (for example, MTA 1 114*a*/MTA 2 114*b*) is associated with a different OAuth Client (not illustrated). For this reason, tokens from different MTAs need to be exchanged for a token that matches an MTA to which a request is routed and that includes scopes as configured when a UAA 116 instance was created for that MTA.

One App Router/FLP 106 represents one Fiori Launchpad Site. Referring to the illustration of FIG. 1, two high-level configuration considerations can include:

1) The App Router/FLP 106 is deployed as an independent MTA (for example, MTA A 108) and illustrated MTA 1 144*a*/MTA 2 114*b* are also independent applications, or
2) The App Router/FLP 106 is embedded with an application (for example, MTA 1 114*a*). In this configuration, MTA B 109 (illustrated with a lighter font color) can be considered to be MTA 1 114*a*, and App Router/FLP 106 is considered to be part of MTA 1 114*a*.

In other words, an App Router/FLP 106 may be deployed "standalone" or embedded with a first application; in both cases, additional independent applications can be added. As will be appreciated by those of ordinary skill in the art, other configurations consistent with this disclosure are possible. Inasmuch as the other configurations are consistent with this disclosure, they are considered to also be within the scope of this disclosure.

Note, while not explicitly illustrated, it is possible to deploy multiple shared App Router/FLPs 106 in a landscape, each one hosting a different FLP Site (for example, each FLP Site associated with an organization). Applications can then be added to an appropriate FLP Site.

Exchanging User Tokens in the FLP for Each MTA

The App Router/FLP 106 can host FIORI apps deployed as different MTAs. While the modules within an MTA share a UAA 116 instance and thus an OAuth Client, different MTAs bind to different UAA 116 instances, each configured with individual scopes specific to the MTA.

As previously described, the FLP hosted in the App Router (106), may be deployed as a separate MTA (for example, MTA A 108) and therefore binding against its own UAA 116 instance, resulting in a separate OAuth Client associated with the App Router/FLP 106. In alternative scenarios, such as the previously described example of MTA B 109, the App Router/FLP 106 can be embedded in a particular MTA (for example, MTA 1 114*a*) together with a base set of FIORI apps provided by other modules in the particular MTA. Here, the particular MTA with the combination of the embedded App Router/FLP 106 and other modules share an instance of the UAA 116/OAuth Client associated with the particular MTA.

In some implementations, when a user logs on to the App Router/FLP 106, leveraging, for example, a standard Security Assertion Markup Language (SAML) authentication flow implemented in the App Router, a token is issued for the OAuth Client associated with the UAA 116 instance of the App Router/FLP 106. However, when further client requests are forwarded to modules of other MTAs that have deployed their FIORI applications to this App Router/FLP 106, the issued token neither matches the OAuth Clients of those MTAs nor do they include the required scopes. Therefore, the token issued to the App Router/FLP 106 during the regular logon flow must be exchanged for another token that matches the MTA to which the request is routed and that includes scopes as configured when the UAA 116 instance was created for that MTA.

This token exchange needs to be performed for each MTA to which the App Router/FLP 106 routes client requests, either for retrieving data to be displayed in dynamic tiles or when a FIORI application is launched. While this approach may create some additional overhead for the token exchange, it provides a secure solution in the sense that each destination target receives a token that is specific to an MTA and restricted to the scopes declared therein. No module in the MTA can use the token to call a module of another MTA hosting FIORI applications in the same FLP, impersonating the user without consent. To mitigate the overhead required to achieve this level of security, the token exchange should happen asynchronously and only on-demand (that is, tokens for FIORI applications that do not have dynamic tiles should only be fetched when the application is launched).

To perform a token exchange, the App Router/FLP 106 calls a UAA 116 instance, providing the original token that was issued when the user 102 logged on and the OAuth Client Secret of the UAA 116 instance of the target MTA. As a response, it receives a code that can be exchanged for a token in another UAA 116 instance call. In an optimized version, both calls may be combined into one. Note that this communication is on a back channel only, not involving browser redirects as required by the original user 102 log-in using SAML.

Once the App Router/FLP 106 has exchanged an original user token for an MTA specific token, the exchanged token also contains an MTA-specific scope. When a FLP configuration specifies that some tiles may only be shown to users that have the specific scope, tiles are then filtered based on the scope read from the exchanged token.

As a prerequisite for this token exchange, the original user token must include a scope uaa.user. Therefore, the App Router/FLP 106 must declare this scope in its list of required scopes in a file xs-security.json. As this is a foreign scope, an administrator-approval workflow can be added to control which application can request tokens with this elevated permission.

Furthermore, the App Router/FLP 106 needs to be in possession of all OAuth Client Secrets of MTAs that deploy FIORI apps to the FLP. This is comparable to a conventional non-FIORI App Router that is bundled within an MTA and that also has access to the information as it binds to the same UAA 116 instance as the other modules in the MTA. However, in the FLP scenario it is essential to support hosting FIORI applications from multiple different MTAs in a FLP, so the MTAs must trust the FLP to handle their OAuth Client Secrets with care and it must also be ensured that no module of one MTA can gain access to the OAuth Client Secret of another MTA using their shared FLP. In the described approach, each MTA deploys its OAuth Client information together with its FLP content to the FLP repository 110 instance. This is done by a FLP Deployer 122 that is shipped as part of the MTA and therefore able to bind to its UAA 116 instance and obtain OAuth Client information. The FLP Deployer 112 also binds to the FLP Repository 110 to deploy the FLP content it embeds and the OAuth Client information (for example, read from an environment variable).

For each MTA providing FIORI applications as well as for the App Router/FLP 106 there is a FLP Repository 110 instance in order to clearly separate the content lifecycle and isolate access, especially to the OAuth Client Secrets. This approach also eases content contribution from different deployment spaces as service instances are created locally within the space where the MTA is deployed. The App Router/FLP 106 uses a "special" instance by choosing a different FLP Repository service broker plan (flp_host) than FLP Deployer 112 applications from contributing MTAs (flp_client) to receive elevated privileges than grant access to all content to be hosted in the FLP, including the OAuth Client Secrets required for the token exchange. By creating this special FLP Repository 110 instance for the App Router/FLP 106, a FLP instance is created to which contributing MTAs can add FIORI applications. As this special instance has elevated privileges, applications other than the intended App Router/FLP 106 must be prevented from creating such instances. As a minimum this requires to allow only one service instance of plan flp_host per FLP instance. Further restrictions (for example, whitelisting the deployment spaces from which service instances with plan flp_host can be created) are also possible.

Figure 2:
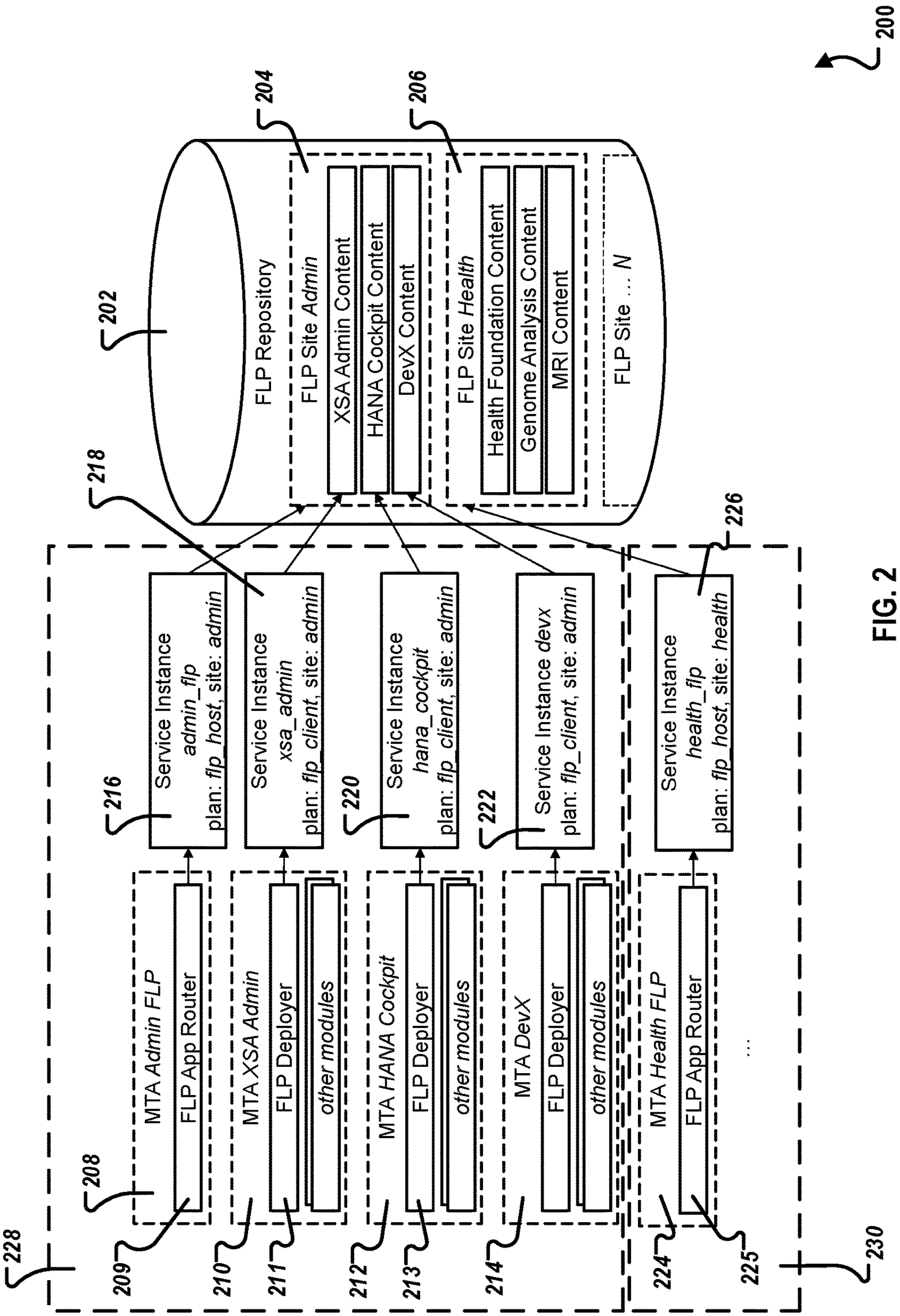
FIG. 2 is a block diagram illustrating relationships between Multi-Tenant Applications (MTAs), their modules, and Sites in the FLP, according to an implementation.

FIG. 2 is a block diagram 200 illustrating relationships between MTAs, their modules, and Sites in the FLP, according to an implementation. As illustrated, diagram 200 includes a FLP Repository 202, MTAs (208, 210, 212, 214, and 224), and Service Instances (216, 218, 220, 222, and 226). FLP Repository 202 includes two of N FLP Site instances 204 and 206. Each of FLP Site instances 204 and 206 are associated with an App Router/FLP (in contrast to the illustrated single App Router/FLP 106 of FIG. 1).

As the FLP Repository 202 stores content for any number of FLP Site instances (for example, FLP Site instances 204 and 206) that are provisioned by separate App Router/FLPs (for example, 209 and 225), there is a need to group associated FLP Repository Service Instances of a particular App Router/FLP together with the Service Instances used by the FLP Deployers (for example, 211 and 213) that contribute content to the FLP instance and separates them from other App Router/FLP and FLP Deployer groups. For example, diagram 200 illustrates two App Router/FLP and FLP Deployer groups (for example, 228 and 230). A natural way to achieve this grouping is to provide a FLP instance name as a parameter (for example, a unique name or identifier) when the FLP Repository Service Instance is created.

To restrict who can deploy content to a named FLP Site (for example, "Admin" 204), FLP Repository Service Instances of plan flp_client (for example, 218, 220, 222) can only be created in the same XSA/CLOUD FOUNDRY organization where the Service Instance of plan flp_host (for example, 216) of the FLP Site 204 was created. For this, a FLP Repository service broker (not illustrated) verifies that all service instances to be created for the same FLP Site are created within the same organization identified by an identifier (for example, organization_quid) passed in a request to the service broker. In other implementations, if cross-org FLP Sites should be needed, a whitelist of organizations allowed to add content to a FLP Site can be leveraged. For example, the whitelist can be used to enable a dashboard UI to permit administration of FLP Sites 204 and 206 for the FLP Repository 202.

Figure 3:
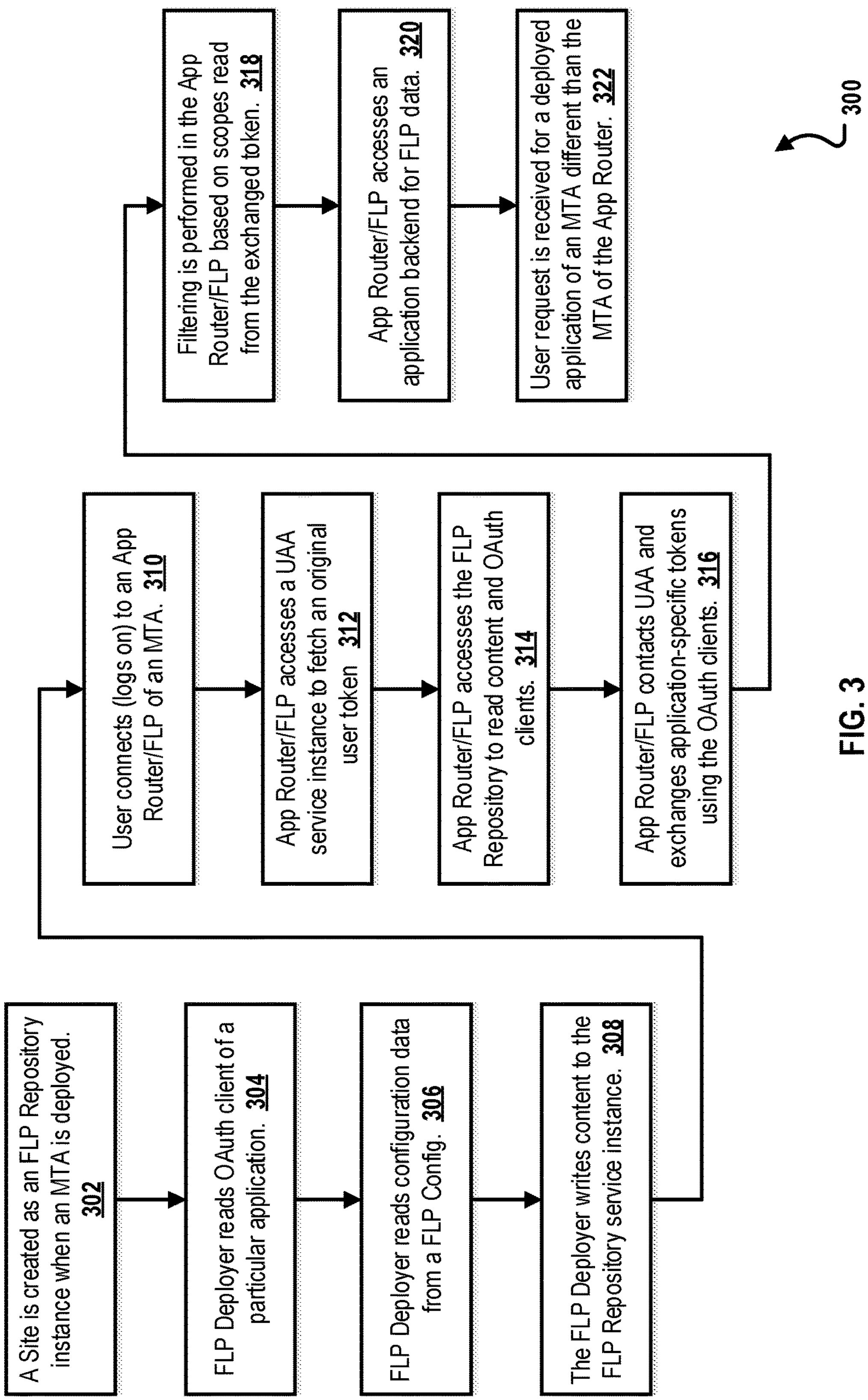
FIG. 3 is a flowchart illustrating an example method for securely integrating independent CLOUD FOUNDRY applications in a FLP, according to an implementation.

FIG. 3 is a flowchart illustrating an example method 300 for securely integrating independent CLOUD FOUNDRY applications in a FLP, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order. In some implementations, all communication between elements in method 300 is encrypted (for example, using HTTPS).

At 302, when an MTA is deployed in a cloud-computing environment, a Site associated with the deployed MTA is created in a FLP Repository. The Site is represented as a FLP Repository service instance ("1" in FIG. 1). From 302, method 300 proceeds to 304.

At 304, for deployment purposes, a FLP Deployer (that is part of each MTA) reads an OAuth Client Secret associated with one or more applications associated with the deployed MTA. All applications within an MTA share the same OAuth Client Secret, meaning that different MTAs with different FLP Deployers would have different OAuth Client Secrets. From 304, method 300 proceeds to 306.

At 306, the FLP Deployer reads configuration data for the applications (for example, configuration files, environment variables, a UAA service instance, and a FLP Repository service instance) from an application-associated FLP Config data store (for example, a database) ("2" in FIG. 1). From 306, method 300 proceeds to 308.

At 308, the FLP Deployer writes the read FLP Config data and the read OAuth Client Secret information as content to the FLP Repository service instance (for example, to the matching FLP Repository service instance ("3" in FIG. 1). From 308, method 300 proceeds to 310.

At 310, a user connects (for example, logs on) to an App Router/FLP associated with a particular MTA ("4" in FIG. 1). From 310, method 300 proceeds to 312.

At 312, the App Router/FLP fetches an original user token for the user from a UAA service instance associated with the App Router/FLP ("5" in FIG. 1). From 312, method 300 proceeds to 314.

At 314, the App Router/FLP accesses the FLP Repository service instance to read content and OAuth Client Secrets for applications that have deployed to the App Router/FLP ("6" in FIG. 1). From 314, method 300 proceeds to 316.

At 316, the App Router/FLP contacts its associated UAA service instance and exchanges the original user token with an MTA/application-specific token using the original user token and the OAuth Client Secret (read from the FLP Repository) of the UAA instance of the deployed applications' target MTA ("7" in FIG. 1). From 316, method 300 proceeds to 318.

At 318, filtering is performed in the App Router/FLP for the user based on scopes read from the exchanged token for applications eligible to be displayed in the FLP (for example, represented in the FLP using graphical user interface tiles). As a result of the filtering, only a subset of tiles will be visible with which a user can make a request (for example, at 322). From 318, method 300 proceeds to 320.

At 320, the App Router/FLP accesses application backends for data for the FLP (for example, information displayed on the tiles associated with the filtered applications) ("8" in FIG. 1). A call can also be made to an application backend once a user selects an element associated with a particular application in the FLP (for example, one of the graphical user interface tiles representing the selected particular application). This call is authenticated with the token that was exchanged for the original user token in 316. From 318, method 300 proceeds to 322.

At 322, a user request is received for a deployed application associated with an MTA (a target MTA) different than the MTA of the App Router/FLP ("9" in FIG. 1). After 322, method 300 stops.

Note that in some implementations, for 304, 308, 312, 314, and 316, the authentication information to perform the respective calls is read from binding data provided in the environment. For example, for 304, the FLP Deployer reads binding information from the UAA service; for 308, the FLP Deployer reads binding information from the FLP Repository; for 312 and 316, the App Router/FLP reads binding information from the UAA service; and for 314, the App Router/FLP reads binding information from the FLP Repository.

Figure 4:
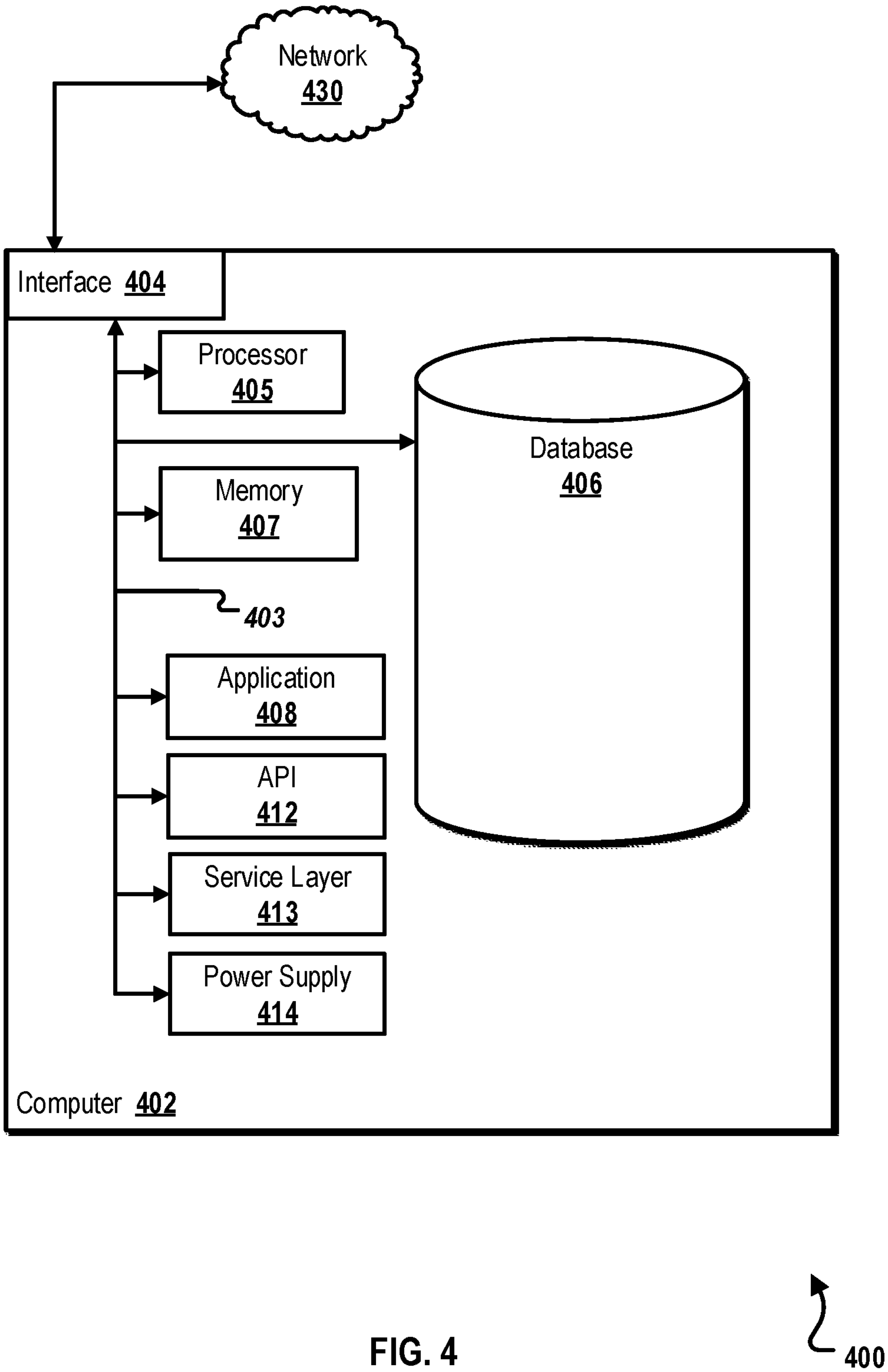
FIG. 4 is a block diagram illustrating an example computer system used to provide computational functionalities associated with described algorithms, methods, functions, processes, flows, and procedures as described in the instant disclosure, according to an implementation.

FIG. 4 is a block diagram of an example computer system 400 used to provide computational functionalities associated with described algorithms, methods, functions, processes, flows, and procedures, as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430 (for example, a network 130). In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and respond to the received requests by processing the received requests using an appropriate software application(s). In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like, storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method, comprising: reading, with a Fiori Launchpad (FLP) Deployer, an Open Authorization (OAuth) Client Secret of an application associated with a Multi-Tenant Application (MTA) deployed in a cloud-computing environment; writing, with the FLP Deployer as content to a FLP Repository, the read OAuth Client Secret and FLP Config data for the application read from a FLP Config data store; accessing, with an App Router and shared FLP (App Router/FLP), the FLP Repository to read content and OAuth Client Secrets for the application that has deployed to the App Router/FLP; accessing a User Account and Authentication (UAA) service associated with the App Router/FLP to fetch an authorization token for a user after receiving a user connection to the App Router/FLP; exchanging an original user authorization token obtained for the user with an application-specific authorization token; and filtering user interface elements displayed in the FLP based on scopes read from the exchanged application-specific authorization token.

The foregoing and other described implementations can each, optionally, include one or more of the following features:

A first feature, combinable with any of the following features, further comprising, responsive to the deployment of the MTA, creating an associated Site in a FLP Repository, wherein the Site is represented by a service instance of a FLP Repository.

A second feature, combinable with any of the previous or following features, wherein the FLP Deployer is part of the MTA.

A third feature, combinable with any of the previous or following features, wherein all applications associated with a particular MTA share the same OAuth Client Secret.

A fourth feature, combinable with any of the previous or following features, wherein the exchange of the original user authorization token uses the OAuth Client Secret, as read from the FLP Repository, of the UAA service for the application's target MTA.

A fifth feature, combinable with any of the previous or following features, further comprising accessing a backend for the application to obtain data for the user interface elements displayed in the FLP.

A sixth feature, combinable with any of the previous or following features, further comprising receiving a user request for a deployed application associated with a target MTA different from the MTA.

In a second implementation, a non-transitory, computer-readable medium storing one or more instructions executable by a computer system to perform operations comprising: reading, with a Fiori Launchpad (FLP) Deployer, an Open Authorization (OAuth) Client Secret of an application associated with a Multi-Tenant Application (MTA) deployed in a cloud-computing environment; writing, with the FLP Deployer as content to a FLP Repository, the read OAuth Client Secret and FLP Config data for the application read from a FLP Config data store; accessing, with an App Router and shared FLP (App Router/FLP), the FLP Repository to read content and OAuth Client Secrets for the application that has deployed to the App Router/FLP; accessing a User Account and Authentication (UAA) service associated with the App Router/FLP to fetch an authorization token for a user after receiving a user connection to the App Router/FLP; exchanging an original user authorization token obtained for the user with an application-specific authorization token; and filtering user interface elements displayed in the FLP based on scopes read from the exchanged application-specific authorization token.

The foregoing and other described implementations can each, optionally, include one or more of the following features:

A first feature, combinable with any of the following features, further comprising one or more instructions to, responsive to the deployment of the MTA, creating an associated Site in a FLP Repository, wherein the Site is represented by a service instance of a FLP Repository.

A second feature, combinable with any of the previous or following features, wherein the FLP Deployer is part of the MTA.

A third feature, combinable with any of the previous or following features, wherein all applications associated with a particular MTA share the same OAuth Client Secret.

A fourth feature, combinable with any of the previous or following features, wherein the exchange of the original user authorization token uses the OAuth Client Secret, as read from the FLP Repository, of the UAA service for the application's target MTA.

A fifth feature, combinable with any of the previous or following features, further comprising one or more instructions to access a backend for the application to obtain data for the user interface elements displayed in the FLP.

A sixth feature, combinable with any of the previous or following features, further comprising one or more instructions to receive a user request for a deployed application associated with a target MTA different from the MTA.

In a third implementation, a computer-implemented system, comprising: a computer memory; and a hardware processor interoperably coupled with the computer memory and configured to perform operations comprising: reading, with a Fiori Launchpad (FLP) Deployer, an Open Authorization (OAuth) Client Secret of an application associated with a Multi-Tenant Application (MTA) deployed in a cloud-computing environment; writing, with the FLP Deployer as content to a FLP Repository, the read OAuth Client Secret and FLP Config data for the application read from a FLP Config data store; accessing, with an App Router and shared FLP (App Router/FLP), the FLP Repository to read content and OAuth Client Secrets for the application that has deployed to the App Router/FLP; accessing a User Account and Authentication (UAA) service associated with the App Router/FLP to fetch an authorization token for a user after receiving a user connection to the App Router/FLP; exchanging an original user authorization token obtained for the user with an application-specific authorization token; and filtering user interface elements displayed in the FLP based on scopes read from the exchanged application-specific authorization token.

The foregoing and other described implementations can each, optionally, include one or more of the following features:

A first feature, combinable with any of the following features, further configured to, responsive to the deployment of the MTA, creating an associated Site in a FLP Repository, wherein the Site is represented by a service instance of a FLP Repository.

A second feature, combinable with any of the previous or following features, wherein the FLP Deployer is part of the MTA.

A third feature, combinable with any of the previous or following features, wherein all applications associated with a particular MTA share the same OAuth Client Secret.

A fourth feature, combinable with any of the previous or following features, wherein the exchange of the original user authorization token uses the OAuth Client Secret, as read from the FLP Repository, of the UAA service for the application's target MTA.

A fifth feature, combinable with any of the previous or following features, further configured to access a backend for the application to obtain data for the user interface elements displayed in the FLP.

A sixth feature, combinable with any of the previous or following features, further configured to receive a user request for a deployed application associated with a target MTA different from the MTA.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware-and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

reading, with a Fiori Launchpad (FLP) Deployer, an Open Authorization (OAuth) Client Secret of an application associated with a Multi-Tenant Application (MTA) deployed in a cloud-computing environment;

writing, with the FLP Deployer as content to a FLP Repository, the read OAuth Client Secret and FLP Config data for the application read from a FLP Config data store;

accessing, with an App Router and shared FLP (App Router/FLP), the FLP Repository to read content and OAuth Client Secrets for the application that has deployed to the App Router/FLP;

accessing a User Account and Authentication (UAA) service associated with the App Router/FLP to fetch an authorization token for a user after receiving a user connection to the App Router/FLP;

exchanging an original user authorization token obtained for the user with an application-specific authorization token; and filtering user interface elements displayed in the FLP based on scopes read from the exchanged application-specific authorization token.

2. The computer-implemented method of claim 1, further comprising, responsive to the deployment of the MTA, creating an associated Site in a FLP Repository, wherein the Site is represented by a service instance of a FLP Repository.

3. The computer-implemented method of claim 1, wherein the FLP Deployer is part of the MTA.

4. The computer-implemented method of claim 1, wherein all applications associated with a particular MTA share the same OAuth Client Secret.

5. The computer-implemented method of claim 1, wherein the exchange of the original user authorization token uses the OAuth Client Secret, as read from the FLP Repository, of the UAA service for the application's target MTA.

6. The computer-implemented method of claim 1, further comprising accessing a backend for the application to obtain data for the user interface elements displayed in the FLP.

7. The computer-implemented method of claim 1, further comprising receiving a user request for a deployed application associated with a target MTA different from the MTA.

8. A non-transitory, computer-readable medium storing one or more instructions executable by a computer system to perform operations comprising:

reading, with a Fiori Launchpad (FLP) Deployer, an Open Authorization (OAuth) Client Secret of an application associated with a Multi-Tenant Application (MTA) deployed in a cloud-computing environment;

writing, with the FLP Deployer as content to a FLP Repository, the read OAuth Client Secret and FLP Config data for the application read from a FLP Config data store;

accessing, with an App Router and shared FLP (App Router/FLP), the FLP Repository to read content and OAuth Client Secrets for the application that has deployed to the App Router/FLP;

accessing a User Account and Authentication (UAA) service associated with the App Router/FLP to fetch an authorization token for a user after receiving a user connection to the App Router/FLP;

exchanging an original user authorization token obtained for the user with an application-specific authorization token; and filtering user interface elements displayed in the FLP based on scopes read from the exchanged application-specific authorization token.

9. The non-transitory, computer-readable medium of claim 8, further comprising one or more instructions to, responsive to the deployment of the MTA, creating an associated Site in a FLP Repository, wherein the Site is represented by a service instance of a FLP Repository.

10. The non-transitory, computer-readable medium of claim 8, wherein the FLP Deployer is part of the MTA.

11. The non-transitory, computer-readable medium of claim 8, wherein all applications associated with a particular MTA share the same OAuth Client Secret.

12. The non-transitory, computer-readable medium of claim 8, wherein the exchange of the original user authorization token uses the OAuth Client Secret, as read from the FLP Repository, of the UAA service for the application's target MTA.

13. The non-transitory, computer-readable medium of claim 8, further comprising one or more instructions to access a backend for the application to obtain data for the user interface elements displayed in the FLP.

14. The non-transitory, computer-readable medium of claim 8, further comprising one or more instructions to receive a user request for a deployed application associated with a target MTA different from the MTA.

15. A computer-implemented system, comprising:

a computer memory; and a hardware processor interoperably coupled with the computer memory and configured to perform operations comprising:

reading, with a Fiori Launchpad (FLP) Deployer, an Open Authorization (OAuth) Client Secret of an application associated with a Multi-Tenant Application (MTA) deployed in a cloud-computing environment;

writing, with the FLP Deployer as content to a FLP Repository, the read OAuth Client Secret and FLP Config data for the application read from a FLP Config data store;

accessing, with an App Router and shared FLP (App Router/FLP), the FLP Repository to read content and OAuth Client Secrets for the application that has deployed to the App Router/FLP;

accessing a User Account and Authentication (UAA) service associated with the App Router/FLP to fetch an authorization token for a user after receiving a user connection to the App Router/FLP;

exchanging an original user authorization token obtained for the user with an application-specific authorization token; and filtering user interface elements displayed in the FLP based on scopes read from the exchanged application-specific authorization token.

16. The computer-implemented system of claim 15, further configured to, responsive to the deployment of the MTA, creating an associated Site in a FLP Repository, wherein the Site is represented by a service instance of a FLP Repository.

17. The computer-implemented system of claim 15, wherein all applications associated with a particular MTA share the same OAuth Client Secret.

18. The computer-implemented system of claim 15, wherein the exchange of the original user authorization token uses the OAuth Client Secret, as read from the FLP Repository, of the UAA service for the application's target MTA.

19. The computer-implemented system of claim 15, further configured to access a backend for the application to obtain data for the user interface elements displayed in the FLP.

20. The computer-implemented system of claim 15, further configured to receive a user request for a deployed application associated with a target MTA different from the MTA.

* * * * *